Figure 1:
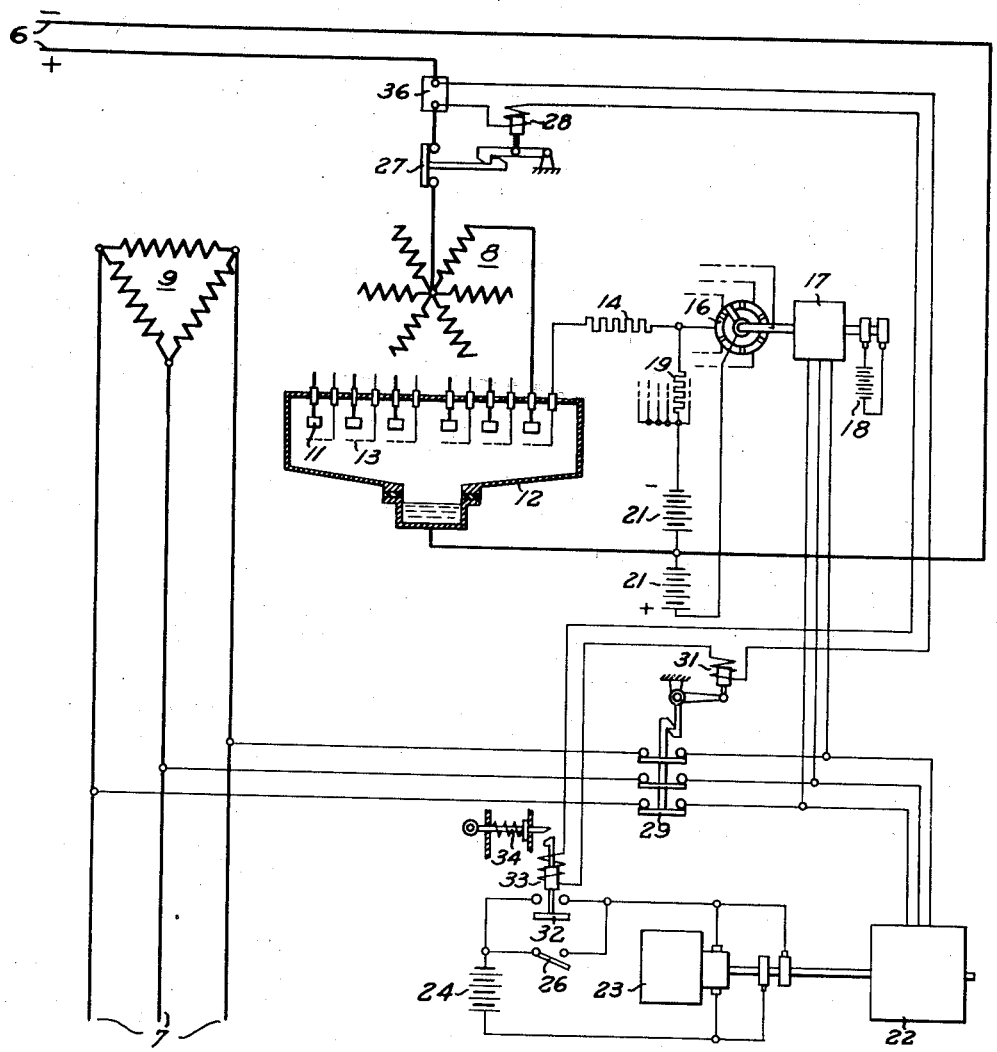

Oct. 17, 1933.  E. KERN  1,930,976
ELECTRIC CURRENT INVERTING SYSTEM
Filed Aug. 31, 1932    2 Sheets—Sheet 1

Inventor
E. Kern
by G. J. DeWein
Attorney

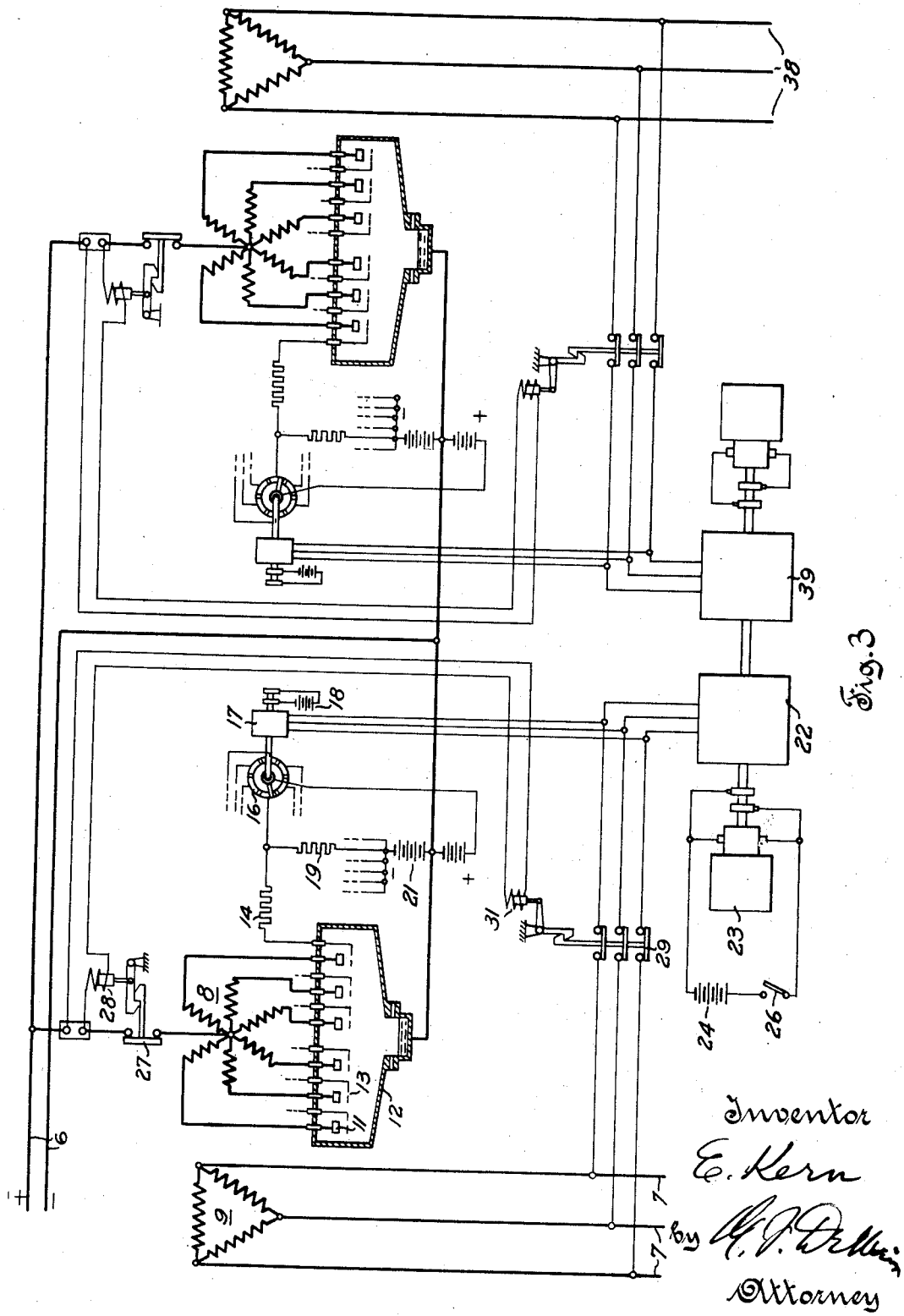

Patented Oct. 17, 1933

1,930,976

UNITED STATES PATENT OFFICE 1,930,976

ELECTRIC CURRENT INVERTING SYSTEM

Erwin Kern, Ennetbaden, Switzerland, assignor to Aktiengesellschaft Brown Boveri & Cie., Baden, Switzerland, a joint-stock company of Switzerland Application August 31, 1932, Serial No. 631,292, and in Germany August 29, 1931

6 Claims. (Cl. 175—363)

This invention relates to the control of systems for converting direct current into alternating current by means of electric current rectifiers of the gaseous or of the metallic vapor arcing type and more particularly to a protective means for systems of such character supplying alternating current circuits not connected with converters of a different character or with generators.

In systems for converting direct current into alternating current by means of electric current inverters supplying an alternating current circuit which is not supplied by any other type of converter, the voltage wave form and the frequency of such voltage in the alternating current output circuit are determined by the terminal voltage of a synchronous motor connected to such circuit. Although such motor provides the wave form for the circuit, the energy required for driving the motor is derived from the converting system and constitutes a negligibly small fraction of the output of the system. The voltage of the output circuit must be equal to the terminal voltage of the synchronous motor and is determined by the magnitude of the voltage in the direct current supply line, by the ratio of the supply transformer used in the system and by the control of the rectifier. When such a converting system is to be put into operation the synchronous motor must first be started and brought up to operating speed and thereupon excited at its normal operating voltage. Such operating voltage is impressed on the windings of the supply transformer which can then be connected with the direct current supply line. If the synchronous motor is not excited at the operating voltage at the time of connection of the supply transformer to the supply line, the motor will draw excessive current which will create a disturbance in the system and will endanger the windings of the motor. During normal operation of the system, if a short circuit occurs in the alternating current output circuit, the alternating current voltage is reduced to a small value and the supply transformer constitutes a short circuit for the direct current supply line so that it becomes necessary to disconnect the inverting system from the supply line by suitable means. At the time of such occurrence the synchronous motor operates as a generator in supplying current to the short circuit point and gradually decreases its speed and its output voltage, so that, when the line is again to be put in operation, the terminal voltage of the motor is below the necessary value and connection of the inverting system with the supply line would produce a detrimental current surge therein. It is then necessary to provide free excitation of the motor thereby introducing a delay in the reaction of the system. If means are provided for disconnecting the synchronous motor from the alternating current circuit and maintaining such motor at its normal speed and at its normal excitation during such disconnection, the system can be immediately put back in operation after a disturbance or a short circuit without the production of undesirable current surges.

It is, therefore, one object of the present invention to provide a control system for inverting systems using electric current rectifiers in which the voltage wave of the alternating current output circuit is determined by means which remain operative during temporary disconnection of the inverting system from the supply line.

Another object of the present invention is to provide a control system for inverting systems using electric current rectifiers in which the voltage wave of the alternating current output circuit is determined by means which are automatically provided with driving means upon temporary disconnection of the inverting system from the supply line.

Another object of the present invention is to provide a control system for inverting systems using electric current rectifiers in which the voltage wave of the alternating current output circuit is determined by means which are automatically disconnected from the output circuit upon occurrence of a disturbance or of a short circuit in such output circuit.

Another object of the present invention is to provide a control system for inverting systems using electric current rectifiers in which the voltage wave of the alternating current output circuit is determined by means which are maintained in operating condition during temporary disconnection of the inverting system from the supply line by means utilizing stored mechanical energy.

Another object of the present invention is to provide a control system for inverting systems using electric current rectifiers in which the voltage wave of the alternating current output circuit is determined by means which are maintained in operating condition during temporary disconnection of the inverting system from the supply line by the voltage wave determining means of the alternating current output circuit of another inverting system.

Objects and advantages other than those above set forth will be apparent from the following description when read in connection with the accompanying drawings in which:

Fig. 1 diagrammatically illustrates one embodiment of the present invention as applied to an inverting system in which the voltage wave determining means of the alternating current output circuit may be automatically disconnected from such circuit and which is provided with driving means upon occurrence of a disturbance in such circuit.

Figure 2:
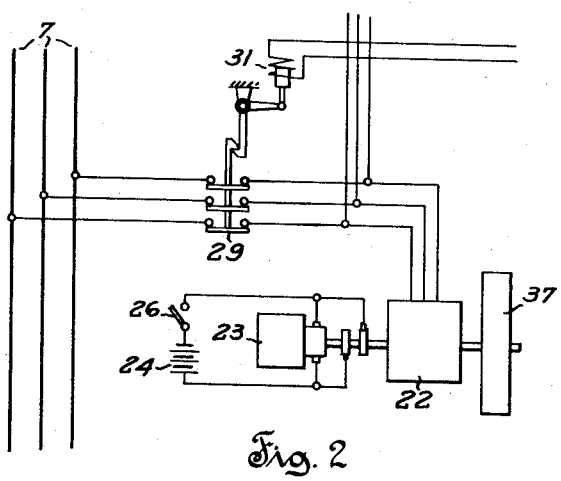

Fig. 2 diagrammatically illustrates a modification of a portion of the system shown in Fig. 1 in which the voltage wave determining means of the alternating current output circuit are maintained at substantially operating speed by means of stored mechanical energy.

Fig. 3 diagrammatically illustrates a further embodiment of the present invention as applied to two inverting systems each provided with means for determining the voltage wave of their respective alternating current output circuits in which such means may be disconnected from the alternating circuit controlled thereby and may then be maintained in operative condition by the means associated with the other inverting system.

Referring more particularly to the drawings by characters of reference, reference numeral 6 designates a direct current supply line supplying current to be inverted into alternating current supplied to an output circuit 7 represented as a three phase line in accordance with prevailing practice. The positive conductor of supply line 6 is connected with the neutral point of primary winding 8 of a transformer having its secondary winding 9 connected with line 7. The negative conductor of supply line 6 is connected with the cathode of a rectifier 12 of the metallic vapor arcing type provided with a plurality of anodes 11 severally connected with the several phase portions of winding 8 and severally controlled by the action of a plurality of control electrodes 13. Each control electrode 13 is connected through a resistance 14 with one contact of a distributor 16 operated by means of synchronous motor 17 having its armature connected with line 7 and its field supplied from a direct current source 18. Each control electrode 13 is also connected through a resistance 19 with the negative terminal of a battery 21 having an intermediate point thereof connected with the cathode of rectifier 12 and its positive terminal connected to the brush of distributor 16. The voltage wave determining means for the line 7 are here represented as consisting of a synchronous motor 22 provided with armature windings connected to line 7 through circuit breaker 29 and a field winding supplied from an exciter 23 mounted on the motor shaft. Exciter 23 is also utilized as a motor for the purpose of bringing motor 22 up to operating speed for which purpose exciter 23 is supplied from a battery 24 through a switch 26. The system is connected with line 6 through a circuit breaker 27 provided with a tripcoil 28 connected in series with the tripcoil 31 of breaker 29 and with the closing coil 33 of a circuit breaker 32 connected in parallel with switch 26 and provided with a latch 34. The armatures 28, 31 or 33 of the circuit breaker operating coils are energized by means responsive to overloads in supply line 6 such as a shunt 36 in circuit in one of the conductors of said line.

When the system is to be brought into operating condition, supply line 6 being energized, closure of switch 26 will permit battery 24 to supply exciter 23 with current thereby permitting exciter 23 to function as a motor to bring motor 22 to its normal operating speed and permits energization of the field windings of motor 22 from battery 24. Motor 17 is then energized from motor 22 operating as a generator and rotates distributor 16 at a speed synchronized with that of motor 22. By closing breaker 29, line 7 is energized at the voltage of motor 22 thereby energizing transformer windings 9 and 8 at operating voltages. Circuit breaker 27 may then be closed to connect line 6 with winding 8 and the system is connected for operation as shown on the drawings. During the operation of the system each control electrode 13 receives a negative potential from battery 21 through resistances 19 and 14, such potential being overcome once during each cycle of the voltage of line 7 by the positive voltage of battery 21 impressed thereon through one of the contacts of distributor 16. The several control electrodes 13 thus sequentially receive a positive potential impulse at the time when the associated anode 11 is positive with respect to the cathode of rectifier 12. Such condition prevails at the times when the voltages of the portions of winding 8 connected with the respective anodes are at a negative potential with respect to the cathode of rectifier 12 and the potential is less negative than the potential of line 6 with respect to the cathode. Each anode 11 thus carries current for a fraction of a cycle and ceases to carry current when the potential of its associated winding portion 8 becomes less than the voltage of another winding portion which then operates with its associated anode.

Upon occurrence of a disturbance or of a short circuit in line 7, shunt 36 energizes cores 28, 31 and 32 at sufficient intensity to produce opening of circuit breakers 27 and 29 and closure of circuit breaker 32 which is maintained in its closed position by latch 34. Exciter 23 then operates as a motor to drive motor 22 at operating speed so that, when the cause of disturbance or the short circuit is removed from line 7, the connections of the system may immediately be replaced in the position shown and the entire inverting system may start to operate without any disturbance.

In Fig. 2, line 6, transformer 8, 9 and rectifier 12 with its associated control are not shown, such elements being identical to the elements shown in the embodiment of Fig. 1. The embodiment of Fig. 2 differs from that of Fig. 1 in that circuit breaker 32 is omitted and motor 22 is provided with a heavy flywheel 37. In the present embodiment the system is started as described above relative to starting of the embodiment shown in Fig. 1 by closure of switch 26 followed by the closure of circuit breakers 29 and 27. The system operates as described above for Fig. 1 and upon occurrence of a disturbance, circuit breakers 27 and 29 are opened in response to current supplied by shunt 36. During such temporary disconnection of the system from the supply line and from the output line, motor 22 continues to rotate by virtue of the inertia thereof and of flywheel 37 and, as it does not furnish any energy to line 7, the speed of such motor will not differ greatly from the operating speed thereof at the time that the disturbance in the system has been removed and the system is reconnected for normal operation.

In the embodiment shown in Fig. 3, supply line 6 is connected with output line 7 through an inverting system identical to that illustrated in Fig. 1 with the exception that circuit breaker 32 shown in Fig. 1 was omitted in Fig. 3. Line 6 is shown as supplying current to a second alternating current line 38 independent of line 7 through an inverting system identical to the system supplying line 7 and not further identified by means of reference numerals with the exception of the voltage wave determining means for line 38 which is represented as a synchronous motor 39. Motors 22 and 39 are mounted on the same shaft for simultaneous rotation thereof. Mechanical connection of motors 22 and 39 permits bringing both motors to operating speed by means of a single battery 24 with its associated switch 26 for operating exciter 23 and a second starting set such as battery 24 with switch 26 are therefore not necessary and are not shown in the system supplying line 38.

In operation, motors 22 and 39 are brought up to operating speed as described above in regard to the embodiment of Fig. 1 and lines 7 and 38 are supplied with current, independently of each other, from their associated inverting systems, the operation of each system being identical to that of the system shown on Fig. 1. Assuming that a disturbance or a short circuit occurs in line 7, shunt 36 will energize the armature 28 and 31 of the circuit breaker operating coils to trip circuit breakers 27 and 29. Motor 22 is then maintained at operating speed and at operating voltage by means of motor 39 which is still energized from line 38 which has not been effected by the disturbance occurring in line 7. When the disturbance has been removed, motor 22 is thus in operating condition and circuit breakers 29 and 27 can be reclosed immediately thereby putting the system back into operation.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a system for inverting direct current into alternating current, a direct current supply line, an alternating current distribution line, an electric valve of the vapor arcing type connecting said supply line and said distribution line, means for controlling the operation of said valve, means for controlling the wave shape of the potential delivered to said distribution line, means for automatically disconnecting said valve and the second said means from said distribution line upon the occurrence of disturbances in said supply line, and means for retaining the second said means in operative condition during the disconnection thereof.

2. In a system for inverting direct current into alternating current, a direct current supply line, an alternating current distribution line, a transformer having one winding connected with said distribution line, an electric valve of the vapor arcing type connected with the other winding of said transformer and with said supply line, means for controlling the operation of said valve, a synchronous motor connected with said distribution line to control the voltage wave shape therein, means for bringing said motor up to operating speed, means for automatically disconnecting said valve and said motor from said distribution line upon the occurrence of disturbances in said supply line, and means for retaining said motor in operative condition during the disconnection thereof.

3. In a system for inverting direct current into alternating current, a direct current supply line, an alternating current distribution line, a transformer having one winding connected with said distribution line, an electric valve of the vapor arcing type connected with the other winding of said transformer and with said supply line, means for controlling the operation of said valve, a synchronous motor connected with said distribution line to control the voltage wave shape therein, means for bringing said motor up to operating speed, a circuit breaker controlling the connection of said valve with said supply line, and a circuit breaker controlling the connection of said motor with said distribution line, the operating magnets of said circuit breaker being connected with said supply line and being simultaneously energized upon the occurrence of disturbances therein to operate said circuit breakers.

4. In a system for inverting direct current into alternating current, a direct current supply line, an alternating current distribution line, a transformer having one winding connected with said distribution line, an electric valve of the vapor arcing type connected with the other winding of said transformer and with said supply line, means for controlling the operation of said valve, a synchronous motor connected with said distribution line to control the voltage wave shape therein, means for bringing said motor up to operating speed, a circuit breaker controlling the connection of said valve with said supply line, a circuit breaker controlling the connection of said motor with said distribution line, the operating magnets of said circuit breaker being connected with said supply line and being simultaneously energized upon the occurrence of disturbances therein to operate said circuit breakers, and means for retaining said motor in operative condition during the disconnection thereof.

5. In a system for inverting direct current into alternating current, a direct current supply line, an alternating current distribution line, a transformer having one winding connected with said distribution line, an electric valve of the vapor arcing type connected with the other winding of said transformer and with said supply line, means for controlling the operation of said valve, a synchronous motor connected with said distribution line to control the voltage wave shape therein, means for bringing said motor up to operating speed, means for automatically disconnecting said valve and said motor upon the occurrence of disturbances in said supply line, and a flywheel driven by said motor for retaining the same in operative condition during the disconnection thereof.

6. In a system for inverting direct current into alternating current, a direct current supply line, a plurality of separate alternating current distribution lines, transformers each having one winding thereof severally connected with said distribution lines, electric valves of the vapor arcing type severally connected with the other windings of said transformers and with said supply line, means severally associated with each of said valves for controlling the operations thereof, a synchronous motor connected with each of said distribution lines to control the voltage wave shape therein, said motors being mechanically connected, and means for bringing said motors up to operating speed.

ERWIN KERN.